US011191015B2

(12) United States Patent
Tan Bergstrom

(10) Patent No.: US 11,191,015 B2
(45) Date of Patent: **\*Nov. 30, 2021**

(54) EFFICIENT COMMUNICATION OF NETWORK IDENTIFIERS

(71) Applicant: GUANGDONG OPPO MOBILE TELECOMMUNICATIONS CORP., LTD., Dongguan (CN)

(72) Inventor: Mattias Tan Bergstrom, Stockholm (SE)

(73) Assignee: Guangdong OPPO Mobile Telcommunications Corp., Ltd., Guangdong (CN)

( * ) Notice: Subject to any disclaimer, the term of this patent is extended or adjusted under 35 U.S.C. 154(b) by 168 days.

This patent is subject to a terminal disclaimer.

(21) Appl. No.: 16/713,545

(22) Filed: Dec. 13, 2019

(65) Prior Publication Data

US 2020/0120591 A1  Apr. 16, 2020

Related U.S. Application Data

(63) Continuation of application No. 15/107,151, filed as application No. PCT/SE2015/051217 on Nov. 13, 2015, now Pat. No. 10,555,251.

(Continued)

(51) Int. Cl.
*H04W 48/18* (2009.01)
*H04W 72/12* (2009.01)
(Continued)

(52) U.S. Cl.
CPC ....... *H04W 48/18* (2013.01); *H04W 72/1263* (2013.01); *H04W 84/12* (2013.01);
(Continued)

(58) Field of Classification Search
CPC . H04W 48/18; H04W 72/1263; H04W 84/12; H04W 88/06; H04W 88/16;
(Continued)

(56) References Cited

U.S. PATENT DOCUMENTS 7,224,673 B1    5/2007  Leung et al.
2007/0275717 A1  11/2007  Edge
(Continued)

FOREIGN PATENT DOCUMENTS

CN    104125615 A    10/2014
EP    2 252 096 A1    11/2010
(Continued)

OTHER PUBLICATIONS

First Examination Report dated Jun. 23, 2020, in corresponding Indian Application No. 201737017934 (6 pages).
(Continued)

*Primary Examiner* — Hardikkumar D Patel
(74) *Attorney, Agent, or Firm* — Finnegan, Henderson, Farabow, Garrett & Dunner, LLP

(57) ABSTRACT

In the context of "operator-controlled Wi-Fi" as in 3GPP TR 37,834 v12,0,0 "Study on Wireless Local Area Network (WLAN)", both in solution2 and solution3, WLAN identifiers need to be communicated between the radio access network, RAN, and the UE. However, WLAN identifiers (e. g., SSIDs, BSSIDs, ESSIDs, HESSIDs, Realm identifiers, NAIs, PLMN identifiers, Domain Name lists, . . . ) are large (e. g., SSID may be up to 32 bytes) and cause a large overhead in the wireless interface. This problem is solved by providing an indexed listing of WLAN Identifiers and by only exchanging the indices across the wireless interface; Preferably, some WLANs may have several indices, and each index may also be used to convey the action to take by the UE.

20 Claims, 6 Drawing Sheets

Related U.S. Application Data

(60) Provisional application No. 62/085,955, filed on Dec. 1, 2014.

(51) Int. Cl.
*H04W 88/06* (2009.01)
*H04W 92/10* (2009.01)
*H04W 84/12* (2009.01)
*H04W 88/16* (2009.01)

(52) U.S. Cl.
CPC ............ *H04W 88/06* (2013.01); *H04W 88/16* (2013.01); *H04W 92/10* (2013.01)

(58) Field of Classification Search
CPC ..... H04W 92/10; H04W 76/02; H04W 48/12; H04W 76/021; H04W 48/16; H04W 28/06; H04W 4/02; H04W 12/08; H04W 72/04; H04W 72/12; H04W 74/0808; H04B 7/0452; H04J 11/0053; G07F 17/32; G07F 17/3225; G07F 17/3237; G07F 17/3241; H04L 67/18; H04L 69/04; H04L 5/0057; H04L 5/0073; H04L 29/06; H04L 63/08

See application file for complete search history.

(56) References Cited

U.S. PATENT DOCUMENTS

| | | | |
|---|---|---|---|
| 2008/0123577 A1* | 5/2008 | Jaakkola | H04W 52/0225 370/311 |
| 2011/0305176 A1 | 12/2011 | Wentink | |
| 2013/0201924 A1 | 8/2013 | Song | |
| 2014/0001930 A1 | 1/2014 | Slogoff et al. | |
| 2014/0010223 A1 | 1/2014 | Wang et al. | |
| 2014/0050320 A1 | 2/2014 | Choyi et al. | |
| 2014/0119300 A1* | 5/2014 | Aboul-Magd | H04L 5/0073 370/329 |
| 2015/0089595 A1* | 3/2015 | Telles | H04W 12/088 726/4 |

FOREIGN PATENT DOCUMENTS

| | | |
|---|---|---|
| EP | 3 220 684 A1 | 9/2017 |
| WO | WO 2007/101176 A1 | 9/2007 |
| WO | WO-2011028464 A2 | 3/2011 |

OTHER PUBLICATIONS

Brazil Technical Report dated Nov. 13, 2015, for corresponding Brazilian Application No. BR112017011400-3 (4 pages).
Author Unknown, "Technical Specification Group Radio Access Network; Study on Wireless Local Area Network (WLAN)—3GPP radio interworking (Release 12)," Technical Report 37.834, Version 12.0.0, 3GPP Organizational Partners, Dec. 2013, 17 pages.
Author Unknown, "Technical Specification Group Services and System Aspects; Architecture enhancements for non-3GPP accesses (Release 12)," Technical Specification 23.402, Version 12.6.0, 3GPP Organizational Partners, Sep. 2014, 288 pages.
Author Unknown, "Technical Specification Group Core Network and Terminals; Access Network Discovery and Selection Function (ANDSF) Management Object (MO) (Release 12)," Technical Specification 24.312, Version 12.6.1, 3GPP Organizational Partners, Oct. 2014, 354 pages.
Author Unknown, "Technical Specification Group Radio Access Network; Radio Resource Control (RRC); Protocol specification (Release 12)," Technical Specification 25.331, Version 12.3.0, 3GPP Organizational Partners, Sep. 2014, 2,204 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 Release 12)," Technical Specification 36.300, Version 12.2.0, 3GPP Organizational Partners, Jun. 2014, 215 pages.
Author Unknown, "Technical Specification Group Radio Access Network; Evolved Universal Terrestrial Radio Access (E-UTRA); User Equipment (UE) procedures in idle mode Release 12)," Technical Specification 36.304, Version 12.2.0, 3GPP Organizational Partners, Sep. 2014, 37 pages.
Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.3.0, 3GPP Organizational Partners, Sep. 2014, 378 pages.
NB3, "EF_APN Note," Change Request, EPT WG7, TS 100 812-2, WG701161v2, Version 2.0.3, Mar. 21, 2001, ETSI, 2 pages.
International Search Report and Written Opinion for International Patent Application No. PCT/SE2015/051217, dated Feb. 29, 2016, 10 pages.
Notice of Opposition, dated Dec. 2, 2020 in corresponding European Application No. 15805650.7 (41 pages).
Author Unknown, "Technical Specification Group GSM/EDGE Radio Access Network; Generic Access Network (GAN); Mobile GAN Interface Layer 3 Specification (Release 12)," Technical Report 3GPP TS 44.318 Version 12.0.0, 3GPP Organizational Partners, Sep. 2014, 252 pages.
Author Unknown, "Technical Specification Group GSM/EDGE Radio Access Network; Generic Access Network (GAN); Stage 2 (Release 11)," Technical Report 3GPP TS 43.318 Version 11.0.0, 3GPP Organizational Partners, Sep. 2012, 128 pages.
Author Unknown, "Technical Specification Group GSM/EDGE Radio Access Network; Generic Access Network (GAN); Stage 2 (Release 12)," Technical Report 3GPP TS 44.318 Version 12.0.0, 3GPP Organizational Partners, Sep. 2014, 128 pages.
Nordmark and Gilligan, Basic Transition Mechanisms for IPv6 Hosts and Routers, Network Working Group RFC 4213, Oct. 2005, (27 pages).
Author Unknown, Terrestrial Trunked Radio (TETRA); Subscriber Identity Module to Mobile Equipment (TSIM-ME) Interface; Part 2: Universal Integrated Circuit Card (UICC); Characteristics of the TSIM Application, Technical Report ETSI ES200 812-2 Version 2.3.2, ETSI ES, Dec. 2003, 138 pages.

* cited by examiner

EFFICIENT COMMUNICATION OF NETWORK IDENTIFIERS

CROSS-REFERENCE TO RELATED APPLICATIONS

This application is a continuation of U.S. patent application Ser. No. 15/107,151, filed Jun. 22, 2016, which is a U.S. National Phase entry under 35 U.S.C. § 371 from International Application No. PCT/SE2015/051217, filed Nov. 13, 2015, which claims benefit of priority to Provisional Application No. 62/085,955, filed Dec. 1, 2014, all of which are incorporated herein by reference.

TECHNICAL FIELD

The techniques described herein relate to the communication of network identifiers, for example identifiers of wireless local area networks, WLANs, between a terminal device and a network node, or between network nodes.

BACKGROUND

The wireless local-area network (KLAN) technology known as "Wi-Fi" has been standardized by IEEE in the 802.11 series of specifications (i.e., as "IEEE Standard for Information technology—Telecommunications and information exchange between systems. Local and metropolitan area networks—Specific requirements. Part 11: Wireless LAN Medium Access Control (MAC) and Physical Layer (PHY) Specifications").

Cellular operator's that are currently serving mobile users with, for example, any of the technologies standardized by the 3rd-Generation Partnership Project (3GPP), including the radio-access technologies known as Long-Term Evolution (LTE), Universal Mobile Telecommunications System (UMTS)/Wideband Code-Division Multiple Access (WCDMA), High Speed Packet Access (HSPA) and Global System for Mobile Communications (GSM), see Wi-Fi as a wireless technology that can provide good additional support for users in their regular cellular networks. There is interest around using the Wi-Fi technology as an extension, or alternative to cellular radio access network technologies to handle the always increasing wireless bandwidth demands. The term "operator-controlled Wi-Fi" points to a Wi-Fi deployment that on some level is integrated with a cellular network operator's existing network and where the 3GPP radio access networks and the Wi-Fi wireless access may even be connected to the same core network and provide the same services.

3GPP is currently working on specifying a feature/mechanism for WLAN/3GPP Radio interworking which improves operator control with respect to how a UE performs access selection and traffic steering between 3GPP and WLANs belonging to the operator or its partners. Three different solutions have been described in 3GPP TR 37.834 v12.0.0 (2013-12) "Study on Wireless Local Area Network (WLAN) 3GPP radio interworking (Release 12)".

In one of the solutions (Solution 2 in TR 37.834), which is also referred to as the "threshold-based mechanism" herein, the 3GPP network (i.e. network node of the first RAT) provides to the UE (the term used to refer to a terminal device by 3GPP) conditions and/or thresholds which are used by the UE in one or more pre-defined rules dictating when the terminal device should steer traffic from one RAT to the other.

In another one of the solutions (Solution 3 in TR 37.834), which is also referred to a "traffic steering command based mechanism" herein, the (3GPP) network configures the UE to send measurement reports related to WLANs the terminal device has discovered (or to WLANs for which certain conditions have been fulfilled). The network would, based on these measurement reports, decide whether the terminal device shall steer traffic towards the reported WLANs. If a terminal device is to steer traffic towards a WLAN, the network sends a traffic steering command to that terminal device.

In both of the above solutions, identifiers of WLANs (also referred to as WLAN identifiers) may need to be communicated between the radio access network, RAN, and the UE. In the threshold-based mechanism, the RAN may communicate a list of WLAN identifiers to the UE that are acceptable for the UE to consider when evaluating the pre-defined rules. In the traffic steering command based mechanism, the RAN may communicate a list of WLAN identifiers to the UE that the UE is to measure, and the UE may communicate the identity of one or more WLANs (i.e. the WLAN identifiers) that fulfill the conditions to the RAN.

WLAN identifiers are large, for example, a Service Set Indicator (SSID) may be up to 32 bytes. The communication of the WLAN identifiers between the RAN and LIE (and between nodes in the network in the event that the WLAN identifier list is provided from one node to another) can therefore generate a lot of signaling between the network and the UE just to identify WLANs. This signaling will decrease system capacity, increase terminal device power consumption, generate interference, etc.

A similar problem exists for other types of WLAN identifiers, such basic SSIDs, BSSIDs, extended SSIDs, ESSIDs, homogenous ESSIDs, HESSIDs, Realm identifiers, Network Access Indicators, NAIs, public land mobile network, PLMN, identifiers, or Domain Name lists, as well as identifiers for networks operating according to other radio access technologies (RATs).

It will be appreciated that these problems are not confined to the communication of network identifiers as part of an interworking mechanism, and that they can arise in other situations where one or more network identifiers are communicated between a UE and network node (or between network nodes).

Therefore, there is a need for a technique for the efficient communication of network identifiers, for example identifiers of WLANs, between a terminal device and a network node, or between network nodes.

SUMMARY

According to a first aspect, there is provided a method of operating a terminal device, the method comprising maintaining one or more indices and a mapping between the one or more indices and respective network identifiers, each network identifier identifying a network and/or a network node; and in communications between the terminal device and a first network in which a particular network and/or a particular network node is to be identified, using the index associated with the particular network and/or the particular network node to identify the particular network and/or the particular network node.

According to a second aspect, there is provided a terminal device, wherein the terminal device is adapted to maintain one or more indices and a mapping between the one or more indices and respective network identifiers, each network identifier identifying a network and/or a network node; and use the index associated with the particular network and/or the particular network node to identify the particular network and/or the particular network node in communications between the terminal device and a first network in which a particular network and/or a particular network node is to be identified.

According to a third aspect, there is provided a method of operating a network node in a first network, the method comprising maintaining one or more indices and a mapping between the one or more indices and respective network identifiers, each network identifier identifying a network and/or a network node; and in communications between the network node and a terminal device or other network node in which a particular network and/or a particular network node is to be identified, using the index associated with the particular network and/or the particular network node to identify the particular network and/or the particular network node.

According to a fourth aspect, there is provided a network node for use in a first network, wherein the network node is adapted to maintain one or more indices and a mapping between the one or more indices and respective network identifiers, each network identifier identifying a network and/or a network node; and use the index associated with the particular network and/or the particular network node to identify the particular network and/or the particular network node in communications between the network node and a terminal device or other network node in which a particular network and/or a particular network node is to be identified.

According to a fifth aspect, there is provided a method of operating a network node in a first network, the method comprising determining one or more indices and a mapping between the one or more indices and respective network identifiers, each network identifier identifying a network and/or a network node; and sending the one or more indices and the mapping to another network node in the first network or to a terminal device in the first network.

According to a sixth aspect, there is provided a network node for use in a first network, the network node being adapted to determine one or more indices and a mapping between the one or more indices and respective network identifiers, each network identifier identifying a network and/or a network node; and send the one or more indices and the mapping to another network node in the first network or to a terminal device in the first network.

According to a seventh aspect, there is provided a computer program product comprising a computer readable medium having computer readable code embodied therein, the computer readable code being configured such that, on execution by a suitable computer or processor, the computer or processor is caused to perform any of the above method embodiments.

According to an eighth aspect, there is provided a terminal device that comprises a processor and a memory, said memory containing instructions executable by said processor whereby said terminal device is operative to maintain one or more indices and a mapping between the one or more indices and respective network identifiers, each network identifier identifying a network and/or a network node; and use the index associated with the particular network and/or the particular network node to identify the particular network and/or the particular network node in communications between the terminal device and a first network in which a particular network and/or a particular network node is to be identified.

According to a ninth aspect, there is provided a network node for use in a first network, the network node comprising a processor and a memory, said memory containing instructions executable by said processor whereby said network node is operative to maintain one or more indices and a mapping between the one or more indices and respective network identifiers, each network identifier identifying a network and/or a network node; and use the index associated with the particular network and/or the particular network node to identify the particular network and/or the particular network node in communications between the network node and a terminal device or other network node in which a particular network and/or a particular network node is to be identified.

According to a tenth aspect, there is provided a network node for use in a first network, the network node comprising a processor and a memory, said memory containing instructions executable by said processor whereby said network node is operative to determine one or more indices and a mapping between the one or more indices and respective network identifiers, each network identifier identifying a network and/or a network node; and send the one or more indices and the mapping to another network node in the first network or to a terminal device in the first network.

According to an eleventh aspect, there is provided a terminal device, the terminal device comprising a first module for maintaining one or more indices and a mapping between the one or more indices and respective network identifiers, each network identifier identifying a network and/or a network node; and a second module for using the index associated with the particular network and/or the particular network node to identify the particular network and/or the particular network node in communications between the terminal device and a first network in which a particular network and/or a particular network node is to be identified.

According to a twelfth aspect, there is provided a network node for use in a first network, wherein the network node comprises a first module for maintaining one or more indices and a mapping between the one or more indices and respective network identifiers, each network identifier identifying a network and/or a network node; and a second module for using the index associated with the particular network and/or the particular network node to identify the particular network and/or the particular network node in communications between the network node and a terminal device or other network node in which a particular network and/or a particular network node is to be identified.

According to a thirteenth aspect, there is provided a network node for use in a first network, the network node comprising a first module for determining one or more indices and a mapping between the one or more indices and respective network identifiers, each network identifier identifying a network and/or a network node; and a second module for sending the one or more indices and the mapping to another network node in the first network or to a terminal device in the first network.

BRIEF DESCRIPTION OF THE DRAWINGS

Exemplary embodiments of the techniques introduced in this document are described below with reference to the following figures, in which.

DETAILED DESCRIPTION

Figure 1:
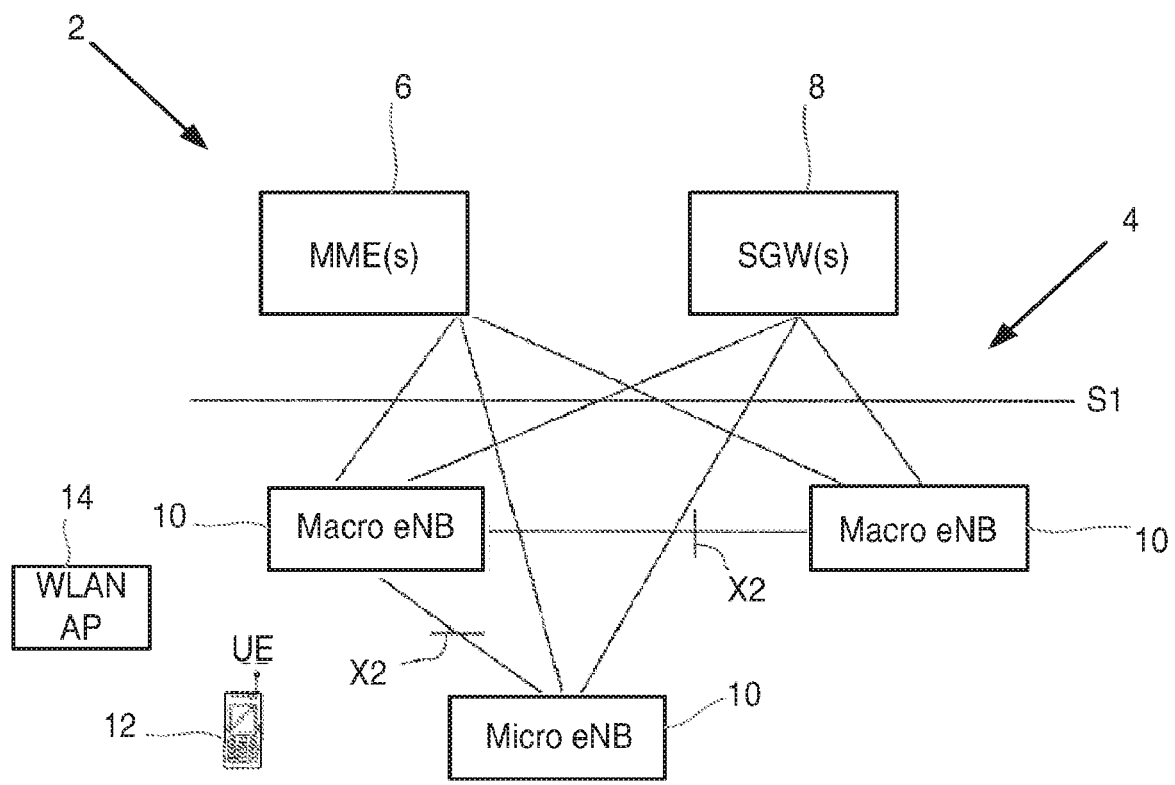
FIG. 1 is a non-limiting example block diagram of an LIE cellular communications network.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor and also in some cases a receiver component and/or transmitter component to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, the terms "processor", "processing unit", "processing module" or "controller" also refer to other hardware capable of performing such functions and/or executing software, such as the example hardware recited above.

Although the description is given for a terminal device or user equipment (UE), it should be understood by the skilled in the art that "terminal device" and "UE" are non-limiting terms comprising any mobile, non-mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE" and "terminal device", the term "mobile device" is used interchangeably in the following description, and it will be appreciated that such a device does not necessarily have to be mobile in the sense that it is carried by a user. Instead, the term "mobile device", as with "terminal device" encompasses any device that is capable of communicating with communication networks that operate according to one or more mobile communication standards, such as GSM, UMTS, LTE, etc.

A cell is associated with a radio access network (RAN) node, where a RAN node comprises in a general sense any node transmitting radio signals in the downlink (DL) to a terminal device and/or receiving radio signals in the uplink (UL) from a terminal device. Some example RAN nodes, or terms used for describing RAN nodes, are base station, eNodeB, eNB, NodeB, macro/micro/pico/femto radio base station, home eNodeB (also known as femto base station), relay, repeater, sensor, transmitting-only radio nodes or receiving-only radio nodes. A RAN node may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band circuitry for different RATs.

It should be noted that unless otherwise indicated, the use of the general term "network node" as used herein refers to a RAN node, such as a base station, an eNodeB, a network node in the RAN responsible for resource management, such as a radio network controller (RNC), a core network node, such as a mobility management entity (MME) or serving gateway (SGW), or a WLAN Access Point (AP).

The signalling described is either via direct links or logical links (e.g. via higher layer protocols and/or via one or more network nodes). For example, signalling from a coordinating node may pass another network node, e.g., a radio node.

FIG. 1 shows an example diagram of an evolved UMTS Terrestrial Radio Access Network (EUTRAN) architecture as part of an LTE-based communications system 2. Nodes in the core network 4 include one or more Mobility Management Entities (MMEs) 6, a key control node for the LTE access network, and one or more Serving Gateways (SGWs) 8 which route and forward user data packets while acting as a mobility anchor. They communicate with base stations 10 in the RAN referred to in LTE as eNBs or eNodeBs, over an interface, for example an S1 interface. The eNBs 10 can include the same or different categories of eNBs, e.g. macro eNBs, and/or micro/pico/femto eNBs. The eNBs 10 communicate with each other over an interface, for example an X2 interface. The S1 interface and X2 interface are defined in the LIE standard. A UE 12 can receive downlink data from and send uplink data to one of the base stations 10 with that base station 10 being referred to as the serving base station of the UE 12. An access point (AP) 14 that is part of a WLAN is also shown in FIG. 1, although it will be appreciated that the WLAN and AP 14 are not part of the EUTRAN architecture.

Figure 2:
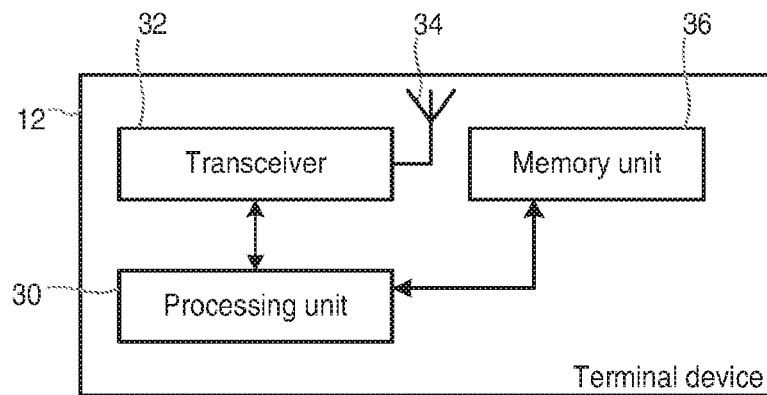
FIG. 2 is a block diagram of a terminal device according to an embodiment.

FIG. 2 shows a terminal device 12 or user equipment (UE) that can be adapted for use in one or more of the non-limiting example embodiments described. The terminal device 12 comprises a processing unit 30 that controls the operation of the terminal device 12. The processing unit 30 is connected to a receiver or a transceiver 32 (which comprises a receiver and a transmitter) with associated antenna(s) 34 which are used to receive signals from or both transmit signals to and receive signals from one or more different types of radio access network (e.g. two or more radio access networks that are operating according to different radio access technologies, RATs), such as RAN node 10 in the LTE network 2 and access point (AP) 14 in a WLAN. The terminal device 12 also comprises a memory unit 36 that is connected to the processing unit 30 and that stores computer program code and other information and data required for the operation of the terminal device 12.

Figure 3:
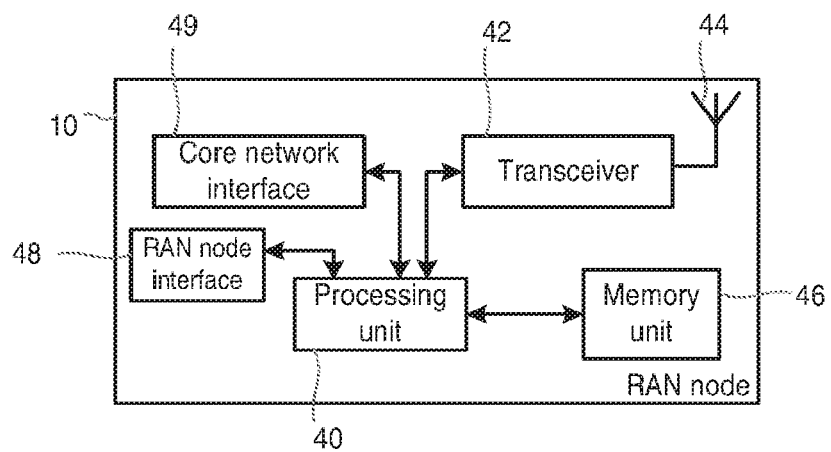
FIG. 3 is a block diagram of a radio access network node according to an embodiment.

FIG. 3 shows a RAN node 10 (for example a base station, NodeB or an eNodeB) that can be adapted for use in example embodiments described. The RAN node 10 comprises a processing unit 40 that controls the operation of the base station 10. The processing unit 40 is connected to a transmitter or a transceiver 42 (which comprises a receiver and a transmitter) with associated antenna(s) 44 which are used to transmit signals to, and receive signals from, terminal devices 12 in the network 2. The RAN node 10 also comprises a memory unit 46 that is connected to the processing unit 40 and that stores computer program code and other information and data required for the operation of the RAN node 10. The RAN node 10 also includes components and/or circuitry 48 for allowing the RAN node 10 to exchange information with other RAN nodes 10 (for example via an X2 interface) and components and/or circuitry 49 for allowing the RAN node 10 to exchange information with nodes in the core network 4 (for example via the S1 interface). It will be appreciated that RAN nodes for use in other types of network (e.g. UTRAN or WCDMA RAN) may include similar components to those shown in FIG. 3 and may, if appropriate, include interface circuitry 48, 49 for enabling communications with the other network nodes in those types of networks (e.g. other base stations, mobility management nodes and/or nodes in the core network).

Figure 4:
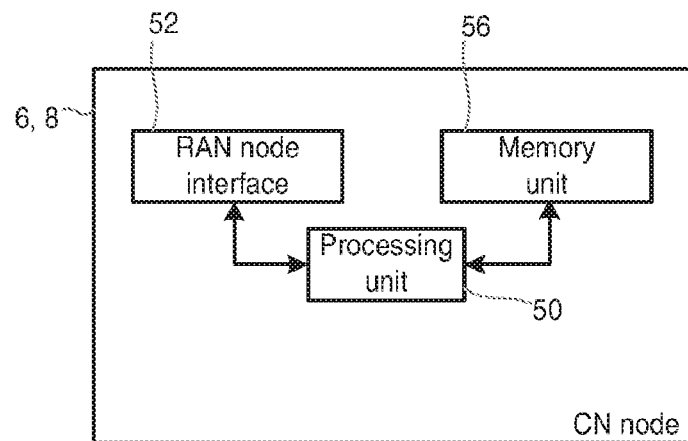
FIG. 4 is a block diagram of a core network node according to an embodiment.

FIG. 4 shows a core network node 6, 8 that can be adapted for use in the example embodiments described. The node 6, 8 comprises a processing unit 50 that controls the operation of the node 6, 8. The processing unit 50 is connected to components and/or circuitry 52 for allowing the node 6, 8 to exchange information with RAN nodes 10 with which it is associated (which is typically via the S1 interface). The node 6, 8 also comprises a memory unit 56 that is connected to the processing unit 50 and that stores computer program code and other information and data required for the operation of the node 6, 8.

Figure 5:
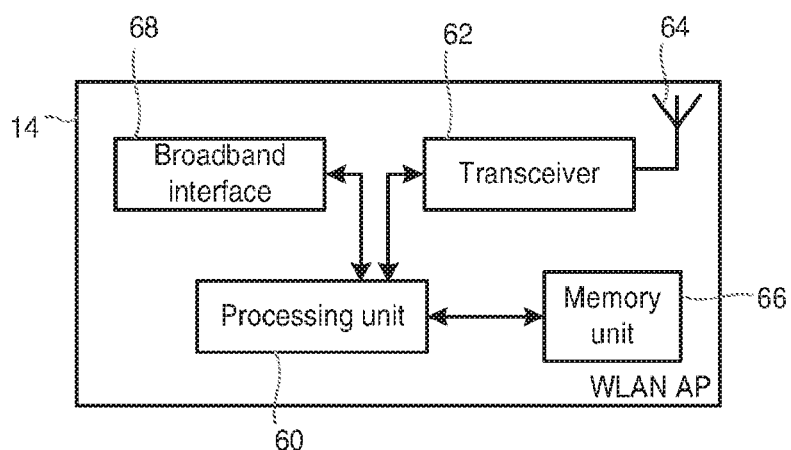
FIG. 5 is a block diagram of a WLAN access point according to an embodiment.

FIG. 5 shows a WLAN AP 14 that can be adapted for use in the example embodiments described. The AP 14 comprises a processing unit 60 that controls the operation of the AP 14. The processing unit 60 is connected to a transmitter or a transceiver 62 (which comprises a receiver and a transmitter) with associated antenna(s) 64 which are used to transmit signals to, and receive signals from, terminal devices 12. The AP 14 also comprises a memory unit 66 that is connected to the processing unit 60 and that stores computer program code and other information and data required for the operation of the AP 14. The AP 14 also includes components and/or circuitry 68 for connecting the AP 14 to a telephone line or other broadband connection.

It will be appreciated that only the components of the terminal device 12, RAN node 10, core network node 6, 8 and AP 14 that are useful to explain the embodiments presented herein are illustrated in FIGS. 2, 3, 4 and 5.

As noted above, it is often useful or required to communicate network identifiers, which identify a particular network or a particular network node (such as an eNB or WLAN AP), between a terminal device and a network node, or between network nodes. These network identifiers can include identifiers used in WLANs (i.e. WLAN identifiers), such as a Service Set Indicator (SSID), a basic SSID, BSSID, an extended SSID, ESSID, a homogenous ESSID, HESSID, a Realm identifier, a Network Access Indicator, NAI, a public land mobile network, PLMN, identifier, or a Domain Name list, as well as identifiers for networks operating according to other radio access technologies (RATs). It will be appreciated that some network identifiers identify both a network and a particular network node. For example a HESSID identifies both a network and a particular WLAN. A HESSID is the BSSID of a certain WLAN AP in a group of APs, and the BSSID of this selected WLAN AP is also used to identify the group of APs.

Since these network identifiers can be quite large, for example, a Service Set Indicator (SSID) may be up to 32 bytes, and it may often be necessary to communicate a number of network identifiers, it is desirable for there to be a technique for the efficient communication of network identifiers between a terminal device and a network node or between network nodes, in order to minimise the signalling required and avoid unnecessarily decreasing system capacity, increasing terminal device power consumption and generating interference.

Thus according to the techniques described herein, to reduce the amount of signaling between the network node and the terminal device (and between network nodes) an identifier-to-index mapping is introduced so that the indices can be signaled instead of explicitly signaling the network identifiers.

In this technique, a mapping between network identifiers and indices is determined. This mapping can be determined by a network node in the radio access network (RAN) or core network (ON), such as an eNB/RNC/MME/etc. The network node can then signal this mapping to a terminal device and/or other network nodes (e.g. from a ON node to one or more RAN nodes, or from a RAN node to other RAN nodes). The indices provided by the mapping can then be used in communications between the network and the terminal device or between network nodes, which avoid having to use the network identifiers themselves in the communications. The indices act as a 'common language' between the network and the terminal or between the network nodes.

Figure 6:
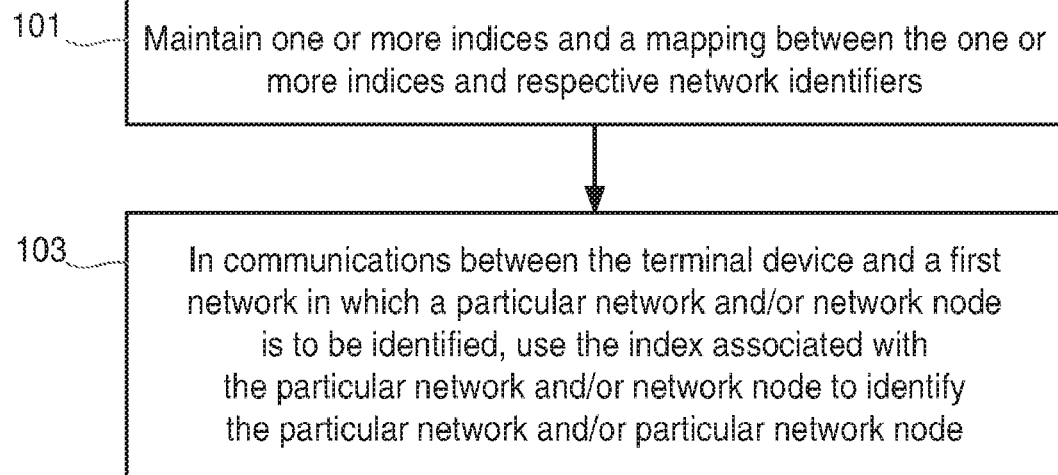
FIG. 6 illustrates a method of operating a terminal device according to an embodiment.

FIG. 6 illustrates an exemplary method of operating a terminal device according to the techniques described herein. Thus, in a first step, step 101, the terminal device 12 maintains one or more indices and a mapping between the one or more indices and respective network identifiers. Each of the network identifiers identifies a network and/or a network node. The indices and mapping can be maintained by storing them in the memory unit 36 of the terminal device 12 or reading them from broadcast or dedicated signalling from the network.

The network identifiers preferably relate to network(s) and/or network nodes in a network other than the first network 2 (although in some embodiments they can relate to network nodes in the same network). The network and/or network nodes can be operating according to the same or a different RAT to the first network 2.

The indices and mapping maintained in step 101 may have been received from the first network 2. In other embodiments, the terminal device 12 may receive a list and/or sequence of network identifiers from the first network 2 and determine the one or more indices and the mapping based on the position of each network identifier in the received list and/or sequence.

Embodiments relating to the form of the indices and mapping are described in more detail below.

After maintaining (e.g. storing or reading) the one or more indices and the mapping, in communications between the terminal device 12 and a first network 2 in which a particular network or a particular network node (e.g. WLAN AP 14) is to be identified, the terminal device 12 uses the index associated with the particular network and/or the particular network node to identify the particular network and/or the particular network node (step 103). As described in more detail below, these communications can comprise downlink communications from the first network 2 that include an index or indices relating to one or more networks and/or network nodes to be identified to the terminal device 12, uplink communications from the terminal device 12 to the first network 2 that include an index or indices relating to one or more networks and/or network nodes to be identified to the first network 2, or both uplink and downlink communications.

Figure 7:
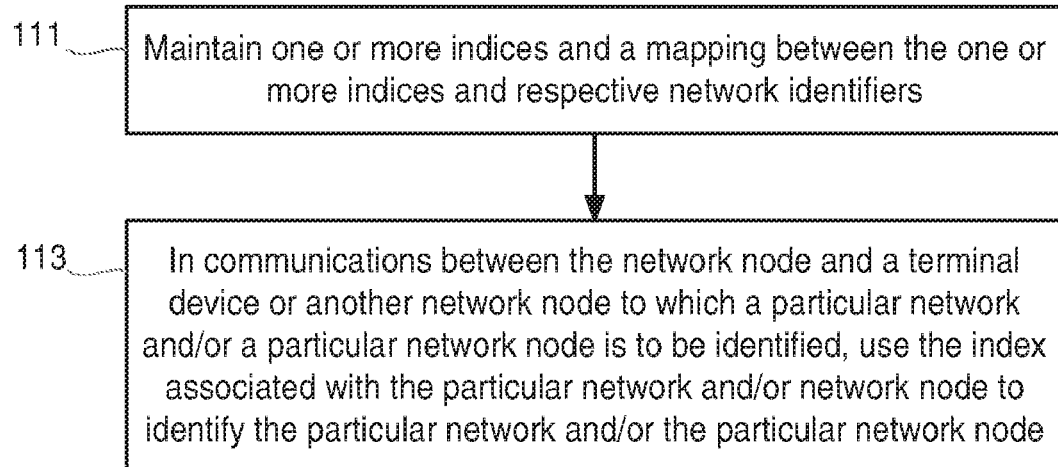
FIG. 7 illustrates a method of operating a network node according to an embodiment.

FIG. 7 illustrates an exemplary method of operating a network node 10 of a first network 2 according to the techniques described herein. The network node may be a node in the RAN of the first network (in which case the network node can be an eNB, RNC or WLAN AP). In a first step, step 111, the network node 10 maintains one or more indices and a mapping between the one or more indices and respective network identifiers. Each of the network identifiers identifies a network and/or a network node (e.g. an eNB or WLAN AP). The indices and mapping can be maintained by storing them in the memory unit 46 of the network node 10.

The network identifiers preferably relate to network(s) and/or network nodes in a network other than the first network 2 (although in some embodiments they can relate to network nodes in the same network). The network and/or network nodes can be operating according to the same or a different RAT to the first network 2.

The indices and mapping maintained in step 111 may have been received from a network node 6 in the core network 4 the first network 2 or another network node 10 in the RAN. In other embodiments, the network node 10 may determine the one or more indices and mapping from a list and/or sequence of network identifiers.

Embodiments relating to the form of the indices and mapping are described in more detail below.

After maintaining the one or more indices and mapping, in communications between the network node 10 and a terminal device 12 or another network node 10 in which a particular network and/or a particular network node is to be identified, the network node 10 uses the index associated with the particular network and/or the particular network node to identify the particular network or the particular network node (step 113). As described in more detail below, these communications can comprise downlink communications from the network node 10 to the terminal device 12 that include an index or indices relating to one or more networks and/or network nodes to be identified to the terminal device 12, uplink communications from the terminal device 12 to the network node 10 that include an index or indices relating to one or more networks and/or network nodes to be identified to the first network 2 by the terminal device 12, or both uplink and downlink communications.

Figure 8:
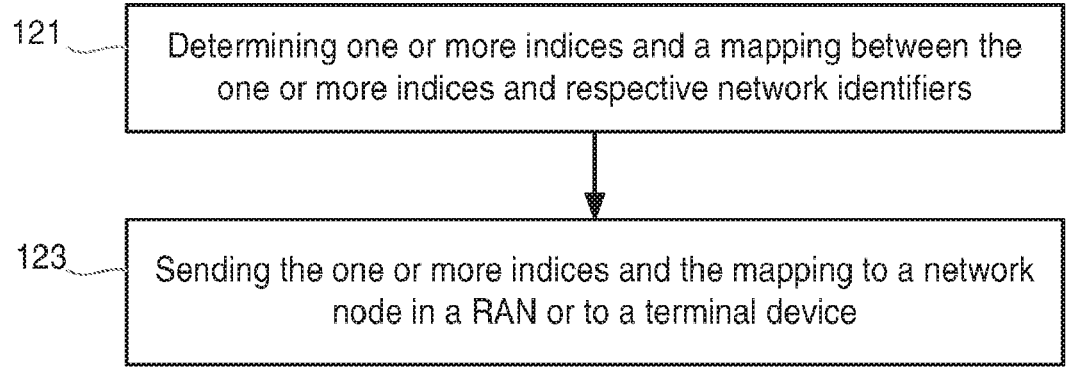
FIG. 8 illustrates another method of operating a network node according to an exemplary embodiment.

In some embodiments, a network node may be responsible for determining the one or more indices and mapping and providing these to other network nodes. A method of operating a network node according to this embodiment is shown in FIG. 8. This method may be performed in a RAN node 10, such as an eNB, RNC or WLAN AP, or a node 6 in the core network 4, such as an MME.

Thus, in step 121, the network node 6 determines one or more indices and a mapping between the one or more indices and respective network identifiers. Each of the network identifiers identifies a network and/or a network node (e.g. an eNB or WLAN AP).

The network identifiers may relate to network(s) and/or network nodes in a network other than the network in which the network node 6 is operating, but in other embodiments they can relate to network nodes in the same network.

The network node 6 then sends the one or more indices and the mapping to a network node 10, for example in the RAN of the network, and/or to a terminal device 12 in the network (step 123).

In the following explanation of the techniques provided herein, the specific example of WLAN identifiers is used, but it will be appreciated that the techniques described below are equally applicable to other types of network identifiers.

In the following various embodiments are described of how a network node associates an index to a network (e.g. WLAN) identifier (which herein will be referred to as identifier-to-index mapping) are described, how a network node communicates these indices and the mapping to the terminal device or to another network node, and how the index can be used in communications between the network node and the terminal devices to reduce signaling overhead.

As noted above the network node sending this mapping may be an eNB, NB, RNC or similar. As noted above in FIG. 8, in some embodiments one network node assigns the indices to the identifiers and this assignment is then used by other network nodes. For example, it will be described below how an MME establishes the identifier to index mapping, and the mapping is used by another network node such as an eNB in its communication with a terminal device.

Although the identifier-to-index mapping is not limited to use in specific situations, protocols or mechanisms, the following description of the identifier-to-index mapping relates to its use in a 3GPP/WLAN interworking mechanism. The interworking mechanism may relate to any one or more of access network selection, traffic steering (where all of a user's traffic or a certain part of a user's traffic is steered to a particular network) and aggregation (where a user's traffic may be split between carriers with networks operating according to different RATs, e.g. a carrier to a WLAN and a carrier to a 3GPP network). Thus, one exemplary use of the techniques is where a 3GPP network node (i.e. a network node in a 3GPP network), such as an eNB, signals WLAN identifiers to a terminal device. The eNB may associate an index or indices with the WLAN identifiers and signal this mapping to the terminal device. This mapping can then be used in communication between the network and the terminal device by referring to the indices instead of the WLAN identifiers.

Two exemplary interworking mechanisms in which the techniques can be applied, the threshold-based mechanism and traffic steering command based mechanism mentioned above, are described in more detail below. These mechanisms/solutions are described in 3GPP TR 37.834 v12.0.0

(2013-12) "Study on Wireless Local Area Network (WLAN)—3GPP radio interworking (Release 12)" as Solutions 2 and 3 respectively.

Solution 2

As noted above, in the threshold based mechanism the 3GPP network (i.e. network node of the first RAT) provides to the UE conditions and/or thresholds which are used by the UE in one or more pre-defined rules dictating when the terminal device should steer traffic from one RAT to the other.

For example, a pre-defined rule could be of the form shown in Table 1 where threshold1, threshold2, threshold3 and threshold4 are provided to the UE by the 3GPP network, i.e. a network node of the first RAT such as an eNodeB, Node B or RNC.

TABLE 1

Example of the threshold based mechanism

If (3GPP signal < threshold1) && (WLAN signal > threshold2) {
    steerTrafficToWLAN( );
} else if (3GPP signal > threshold3) || (WLAN signal < threshold4) {
    steerTrafficTo3gpp( );
}

This exemplary rule provides that it the UE measured 3GPP signal is below threshold1 and the UE measured WLAN signal is above threshold2 then the terminal device steers traffic to WLAN. Otherwise, if the 3GPP signal is above threshold3 and the WLAN signal is below threshold4 the terminal device steers traffic to 3GPP.

The term '3GPP signal' herein could mean the signal transmitted by a radio network node belonging to a 3GPP RAT, e.g. a node in a LTE, HSPA, GSM etc. network, and/or it could be the quality of such a signal. The term 'WLAN signal' herein could mean the signal transmitted by a radio network node belonging to WLAN, e.g. an access point (AP) etc., and/or it could be the quality of such a signal. Examples of measurements of 3GPP signals include are reference signal received power (RSRP) and reference signal received quality (RSRQ) in LTE or common pilot channel (CPICH) received signal code power (RSCP) and CPICH Ec/No in HSPA. Examples of measurements of WLAN signals are Received Signal Strength Indicator (RSSI), Received Channel Power Indicator (RCPI), Received Signal to Noise Indicator (RSNI), etc.

A high level description of this threshold based mechanism is provided below and also in 3GPP TS 36.300 v12.2.0

23.6 Access Network Selection and Traffic Steering Between E-UTRAN and WLAN

This section describes the mechanisms to support traffic steering between E-UTRAN and WLAN.

23.6.1 General Principles

This version of the specification supports E-UTRAN assisted UE based bi-directional traffic steering between E-UTRAN and WLAN for UEs in RRC_IDLE and RRC_CONNECTED.

E-UTRAN provides assistance parameters via broadcast and dedicated RRC signalling to the UE. The RAN assistance parameters may include E-UTRAN signal strength and quality thresholds, WLAN channel utilization thresholds, WLAN backhaul data rate thresholds, WLAN signal strength and quality thresholds and Offload Preference Indicator (OPI). E-UTRAN can also provide a list of WLAN identifiers to the UE via broadcast signalling. WLANs provided by E-UTRAN may include an associated priority.

The UE uses the RAN assistance parameters in the evaluation of:

Traffic steering rules defined in TS 36.304 [11]; or

ANDSF policies defined in TS 24.312 [58]

for traffic steering decisions between E-UTRAN and WLAN as specified in TS 23.402[19].

The OPI is only used in ANDSF policies as specified in TS 24.312 [58].

WLAN identifiers are only used in traffic steering rules defined in TS 36.304 [11].

If the UE is provisioned with ANDSF policies it shall forward the received RAN assistance parameters to upper layers, otherwise it shall use them in the traffic steering rules defined in section 23.6.2 and TS 36.304 [11]. The traffic steering rules defined in section 23.6.2 and TS 36.304 [11] are applied only to the WLANs of which identifiers are provided by the E-UTRAN.

The UE in RRC_CONNECTED shall apply the parameters obtained via dedicated signalling if such have been received from the serving cell; otherwise, the UE shall apply the parameters obtained via broadcast signalling.

The UE in RRC_IDLE shall keep and apply the parameters obtained via dedicated signalling, until cell reselection or a timer has expired since the UE entered RRC_IDLE upon which the UE shall apply the parameters obtained via broadcast signalling.

In the case of RAN sharing, each PLMN sharing the RAN can provide independent sets of RAN assistance parameters.

23.6.2 Access Network Selection and Traffic Steering Rules

The UE indicates to upper layers when (and for which WLAN identifiers along with associated priorities, if any) access network selection and traffic steering rules defined in TS 36.304 [11] are fulfilled. The selection among WLAN APs that fulfil the access network selection and traffic steering rules is up to UE implementation.

When the UE applies the access network selection and traffic steering rules defined in TS 36.304 [11], it performs traffic steering between E-UTRAN WLAN with APN granularity.

User preference takes precedence (FFS whether it does not apply to particular scenarios).

Solution 3

As noted above, in the traffic steering command based mechanism, the (3GPP) network configures the terminal device to send measurement reports related to WLANs the terminal device has discovered (or to WLANs for which certain conditions have been fulfilled). The network would, based on these measurement reports, decide whether the terminal device shall steer traffic towards the reported WLANs. If a terminal device is to steer traffic towards a WLAN, the network sends a traffic steering command to that terminal device.

The following detailed description of this solution is also found in section 6.1.3 of TR 37.834:

In this solution the traffic steering for UEs in RRC CONNECTED/CELL_DCH state is controlled by the network using dedicated traffic steering commands, potentially based also on WLAN measurements (reported by the UE).

For UEs in IDLE mode and CELL_FACH, CELL_PCH and URA_PCH states the solution is similar to solution 1 or 2 [as described in TR 37.834].

Alternatively, UEs in those RRC [Radio Resource Control] states can be configured to connect to RAN and wait for dedicated traffic steering commands.

Figure 9:
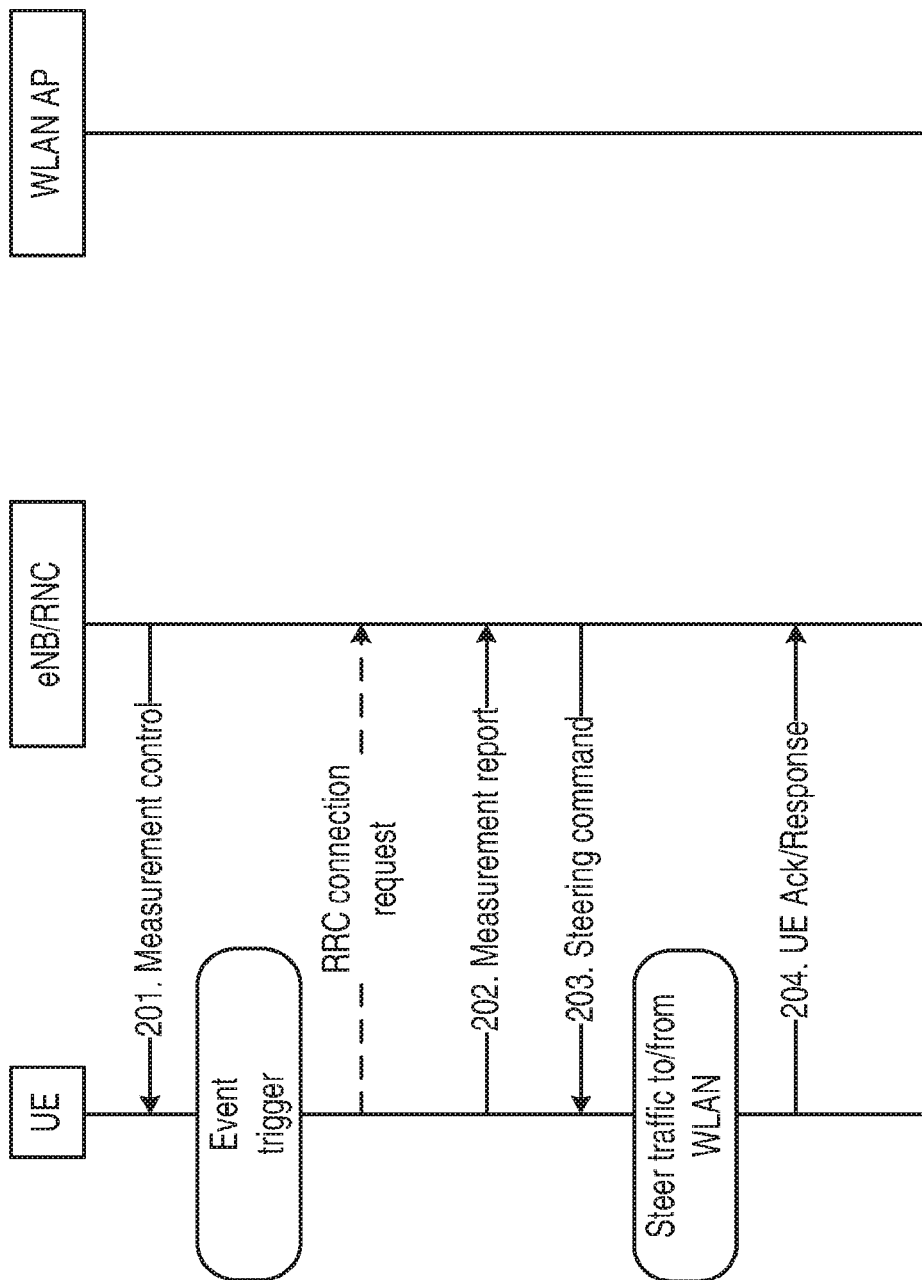
FIG. 9 is a diagram illustrating one example of a network interworking feature.

Overall description—As an example, traffic steering for UEs in RRC CONNECTED/CELL_DCH comprises the following steps as shown in FIG. 9.

Step 201. Measurement control: The eNB/RNC configures the UE measurement procedures including the identity of the target WLAN to be measured.

Step 202. Measurement report: The UE is triggered to send MEASUREMENT REPORT by the rules set by the measurement control.

Step 203. Traffic steering: The eNB/RNC sends the steering command message to the UE to perform the traffic steering based on the reported measurements and loading in the RAN.

The above procedures do not take into account user preference and/or the WLAN radio state. For example, based on user preferences and/or WLAN radio state, a UE may not be able to perform the configured measurement events. Additionally, the procedures need to allow a UE to be able to prioritize non-operator WLAN over operator WLAN. For example, the UE may disassociate from the operator WLAN and associate with the higher priority non-operator WLAN at any time during the measurement process.

The procedure illustrated above, and the following description can apply to UMTS CELL_FACH as well. The procedure can also be extended to UMTS/LTE Idle modes and UMTS CELL/URA_PCH states, e.g. UEs may be configured to report some indication (e.g. on available WLAN measurements) in a RRC UL message, e.g., RRC connection request (from Idle, in UMTS/LTE) or CELL UPDATE (in UMTS CELL/URA_PCH states).

Some of the steps above, e.g. steps 201 & 202, can be optional, based on RAN/UE configuration.

Step 201: Measurement control—For measurement control, the following examples are types of information can be configured for the UE to measure the operator WLAN:
1. Measurement events to trigger reporting as defined in Table 2 below
2. Target identification as defined in Table 3 below
3. Measurements to report as defined in Table 4 below Based on the measurement events defined in 3GPP TS 36.331 ["Evolved Universal Terrestrial Radio Access (E-UTRA); Radio Resource Control (RRC); Protocol specification"] and 3GPP TS 25.331 ["Radio Resource Control (RRC); Protocol Specification"], Table 2 shows the candidate measurement events for WLAN:

TABLE 2

Candidate measurement events for reporting WLAN

| Event | Description |
| --- | --- |
| W1 | WLAN becomes better than a threshold (to trigger traffic steering to WLAN) |
| W2 | WLAN becomes worse than a threshold (to trigger traffic steering from WLAN) |
| W3 | 3GPP Cell's radio quality becomes worse than threshold1 and WLAN's radio quality becomes better than threshold2 (to trigger traffic steering to WLAN) |
| W4 | WLAN's radio quality becomes worse than threshold1 and 3GPP Cell's radio quality becomes better than threshold2 (to trigger traffic steering from WLAN) |

The thresholds are based on the values of the measurements to report defined in Table 4 below.

The target identification is used to indicate to the UE which WLAN to consider for the measurement control procedures including the target WLAN ID and the operating channels to search for. Table 3 shows the candidate target identifiers for WLAN.

For steering traffic from WLAN, i.e., W2/W4, it may be sufficient that just the serving WLAN below a threshold is reported, i.e. the WLAN target identifiers are not needed.

TABLE 3

Candidate target identifiers for WLAN

| Identifier | Description | Availability in WLAN |
| --- | --- | --- |
| BSSID | Basic Service Set Identifier: For infrastructure BSS, the BSSID is the MAC address of the wireless access point | Beacon or Probe Response |
| SSID | Service Set Identifier: The SSID can be used in multiple, possibly overlapping, BSSs | Beacon or Probe Response |
| HESSID | Homogeneous Extended Service Set Identifier: A MAC address whose value shall be configured by the Hotspot Operator with the same value as the BSSID of one of the APs in the network. All APs in the wireless network shall be configured with the same HESSID value. | Beacon or Probe Response (802.11) |
| Domain Name List | Domain Name List element provides a list of one or more domain names of the entity operating the WLAN access network. | ANQP (HS 2.0) |
| Operating class, channel number | Indication of the target WLAN frequency. See Annex E of 802.11 [5] for definitions of the different operating classes | N/A |

NOTE: If above information is not available in eNB/RNC, it is possible for RAN to configure general WLAN measurements Step 202: Measurement report—Table 4 shows the candidate measurements to report for WLAN.

TABLE 4

Candidate measurement to report for WLAN

| Identifier | Description | Availability in WLAN |
|---|---|---|
| RCPI | Received Channel Power Indicator: Measure of the received RF power in the selected channel for a received frame in the range of −110 to 0 dBm | Measurement |
| RSNI | Received Signal to Noise Indicator: An indication of the signal to noise plus interference ratio of a received IEEE 802.11 frame. Defined by the ratio of the received signal power (RCPI-ANPI) to the noise plus interference power (ANPI) in steps of 0.5 dB in the range from −10 dB to +117 dB | Measurement |
| BSS Load | Contains information on the current STA population and traffic levels in the BSS. | Beacon or Probe Response (802.11k) |
| WAN metrics | Includes estimates of DL and UL speeds and loading as well as link status and whether the WLAN AP is at capacity. | ANQP (HS 2.0) |

Step 203: Traffic steering—In order for RAN to control traffic routing (if agreed to be supported) if ANDSF [Access Network Discovery and Selection Function] is not used, the RAN would need to know which APNs [Access Point Names]/bearers may be (not) offloaded. The RAN also needs means to inform the UEs accordingly so that e.g. the UE can issue the corresponding binding update with the CN over S2c. This would impact signalling between CN and eNB as well as the UE behaviour between AS and NAS level. Table 5 shows candidate examples for identifying the traffic to steer to or from WLAN.

TABLE 5

Candidate identifiers of the traffic to steer to or from WLAN

| Identifier | Description |
|---|---|
| DRB/RB-ID | Identity of a radio bearer |
| QCI | QoS Class Identifier |

Establishing the Mapping Between Network Identifiers and Indices

In some embodiments the indices are numerical values. The index may therefore be an integer value. Possible ranges are 0-15, 1-16, etc, although the range can depend on how many network identifiers there are. The mapping would then indicate the associated numerical value for each WLAN identifier. One example how this mapping could be communicated from a network node 10 to a terminal device 12 in RRC is illustrated below where the information element wlan-identifierIndex indicates which index the associated identifier has:

```
WLAN-IdPerPLMN-r12 ::=   SEQUENCE {
    wlan-Identifiers     CHOICE {
        ssid             OCTET STRING (SIZE (1..32)),
        bssid            OCTET STRING (SIZE (6)),
        hessid           OCTET SIRING (SIZE (6))
    },
    wlan-identifierIndex INTEGER (1..maxWLAN-Id-r12)
    OPTIONAL -- Need OR
}
```

In some embodiments a default index will be assigned by a terminal device 12 or other network node 10 to a WLAN identifier for which the network has not provided an index. The index may then not need to be signaled to the terminal device 12 or the other network node 10 and additional signaling overhead reduction can be achieved. An example how this can be implemented in RRC is shown below where the value 0 is the default value for WLAN identifiers.

```
WLAN-IdPerPLMN-r12 ::=   SEQUENCE {
    wlan-Identifiers     CHOICE {
        ssid             OCTET STRING (SIZE (1..32)),
        bssid            OCTET STRING (SIZE (6)),
        hessid           OCTET STRING (SIZE (6))
    },
    wlan-identifierIndex INTEGER (1..maxWLAN-Id-r12)
    DEFAULT              0
}
```

This index may alternatively be an alphanumeric or alphabetic character. An example of how this can be implemented in RRC is shown below.

```
WLAN-IdPerPLMN-r12 ::=   SEQUENCE {
    wlan-Identifiers     CHOICE {
        ssid             OCTET STRING (SIZE (1..32)),
        bssid            OCTET STRING (SIZE (6)),
        hessid           OCTET STRING (SIZE (6))
    },
    wlan-identifierIndex IA5String
    OPTIONAL -- Need OR
}
```

In some embodiments the mapping is implicit, and it is not necessary for a network node to explicitly signal the mapping and index associated with each identifier since a terminal device 12 or other network node 10 will implicitly know the index of an identifier. One possible way of implementing implicit mapping is for the index to be determined based on the position of the network identifier in a list and/or sequence. For example, a list and/or sequence of WLAN identifiers can be indicated in the following order: SSID A, SSID B, SSID C. The indices could then be mapped as: SSID A has index 1 (or 0), SSID B has index 2 (or 1), SSID C has index 3 (or 2).

In some embodiments, the index can be signaled using a priority indicator. The example below shows how a priority indicator can be used. The priority indicator would need to be signaled as a unique value for each network identifier if it is to be possible to distinguish different identifiers (i.e. two WLAN identifiers cannot have the same priority). However, it would be possible for multiple WLAN identifiers to have the same index (i.e. priority indicator in this embodiment) in case it is acceptable that the identifiers which share a priority indicator are treated similarly (e.g. the network sends a traffic steering command which targets multiple WLANs).

```
WLAN-IdPerPLMN-r12 ::=    SEQUENCE {
    wlan-Identifiers      CHOICE {
        ssid              OCTET STRING (SIZE (1..32)),
        bssid             OCTET SIRING (SIZE (6)),
        hessid            OCTET STRING (SIZE (6))
    },
    wlan-Priority         INTEGER (1..maxWLAN-Id-r12),
    OPTIONAL -- Need OR
}
```

In some embodiments the same index may be assigned to multiple network identifiers. This could be done for networks or network nodes that do not need to be treated or considered differently (for example in an access network selection and/or traffic steering mechanism). For example, if in a certain situation WLAN A and WLAN B can be treated similarly those identifiers could be assigned the same index. However if two WLANs should be treated differently, then different indices could be assigned to the two WLANs (for example if one WLAN belongs to the operator and the other WLAN belongs to the operator's partner and may cost more to use, then the operator may want to treat the WLANs differently and hence assign different indices to the two WLANs).

In some embodiments multiple indices can be assigned to a network identifier. This allows a WLAN identifier to be assigned one index which is common for multiple WLAN identifiers while also being assigned an index which is unique to that WLAN identifier (or common to a smaller group of identifiers). The benefit of this in an access network selection and/or traffic steering mechanism is that the network 10 and terminal device 12 may use the index that is common for multiple WLAN identifiers (i.e. a low granular index) in situations where it is not important to distinguish those WLAN identifiers, while one unique identifier could also be indicated by using a unique index (i.e. a high granular index). For example, consider a scenario where the traffic steering command based mechanism described above is used and the network wants to perform offloading to WLAN for a terminal device. The network may then request the terminal device 12 perform measurements of multiple WLANs by using the low granular index (so that multiple WLANs are measured). The terminal device 12 would then report back to the network in a measurement report; however in this measurement report it may be important to get measurements per WLAN identifier and hence the terminal device 12 could report the measurements and indicate the high granular index.

Example 1 below shows one possible identifier-to-index mapping. In this example there are two identifiers (BSSID V and BSSID W) which have the same index. This may be used for example if the two WLAN identifiers have some commonality such as belonging to the same SSID. The network may not need to distinguish between BSSID V and BSSID W if these belong to the same SSID. Example 1 also shows how each identifier can have multiple indices (indicated by the additional index in the Index2 column).

| WLAN identifier | Index1 | Index2 |
|---|---|---|
| BSSID U | 1 | A |
| BSSID V | 2 | B |
| BSSID W | 2 | C |
| SSID X | 3 | D |
| SSID Y | 6 | E |

Example 1: WLAN Identifier to Index Mapping

The mapping may be signaled to a terminal device 12 by a RAN node 10 using broadcast signaling. Signaling the mapping with broadcast signaling will ensure that it does not need to be signaled to each terminal device 12 that needs to receive it, hence radio resources may be saved.

Alternatively, the mapping may be signaled to the terminal device 12 using dedicated signaling. The benefit of using dedicated signaling is that different terminal devices may be provided with different identifier-to-index mappings which could allow for differentiation of terminal devices 12.

In some embodiments the mapping can be signaled to a terminal device 12 by a core network node 6 such as an MME. The MME 6 can then inform the terminal device 12 of the mapping using non-access stratum (NAS) signaling. The MME 6 may also signal this mapping to the RAN node 10 (e.g. to an eNB over the S1-interface) so that the RAN node 10 can interpret a communication (e.g. a measurement report) containing indices received from the terminal device 12.

In some embodiments the identifier to index mapping can be preconfigured in the terminal device 12. One example is that the indices and mapping is provided to the terminal device 12 on a subscriber identity module (SIM)-card or similar entity. Network nodes (e.g. in the RAN) could then be informed of the appropriate mapping, for example by operations administration and management (OAM) configuration.

When the identifier-to-index mapping has been established and provided to the terminal device 12 and/or RAN node 10 the mapping can be used to reduce the amount of signaling between the terminal device 12 and the network 2 or between network nodes 10 in the network 2. The following section provides some examples of how the identifier-to-index mapping can be used.

Uses of WLAN Identifiers

In some embodiments the terminal device 12 or network node 10 will, when sending a message to another node (e.g. network node 10 or terminal device 12) in which a WLAN identifier should be conveyed, include the index (or indices) associated with the WLAN identifier instead of e.g. reporting the identifier itself. For example, a terminal device 12 could be configured to report to the network the indices of WLANs for which one or more criteria are fulfilled. Example criteria can include:
  A WLAN has been detected.
  One or more measured signal metrics of a WLAN node 14 are above (or below) thresholds.
  The load and/or capacity of a WLAN node 14 is above (or below) a threshold.

For example, the terminal device 12 can be configured to report to the 3GPF RAN when it has detected WLAN APs with an SSID X, and the terminal device 12 would then report the index associated with SSID X, e.g. 3 and/or D (as indicated in Example 1 above). In another example, the terminal device 12 may have measured (or received an indication of) that a WLAN with BSSID V has, for example, a load level below 40% and a measured signal strength above 60 dBm, and the terminal device 12 would then report index 2 and/or C (2 and C being the indices for BSSID V in Example 1).

One WLAN AP 14 can have identifiers of different types. For example, a WLAN AP 14 could have an SSID X and a BSSID U. In some embodiments, the terminal device 12 will report the index associated with only one identifier associated with a WLAN. For example, if a WLAN node 14 has SSID X with index 3 and has a BSSID U with index 1 the terminal device 12 may be configured to only report either 3 or 1. Which of the multiple indices are to be reported may, for example, be decided based on the type of identifiers. Since BSSIDs are of higher granularity (associated with a specific WLAN node 14) while SSIDs have lower granularity (associated with a group of WLAN APs 14) it would provide more information to the network if the terminal device 12 reports that has detected a certain BSSID instead of detecting a certain SSID, i.e. the UE would in the example above report index '1'. It would also be possible for the network to configure the terminal device 12 as to which index the terminal device 12 should apply. In an alternative embodiment the terminal device 12 can report all applicable indices for a WLAN. Using the example above, the terminal device 12 would then report both indices '3' and '1'.

In case multiple WLANs that share an index meet the criteria for sending a measurement report, the terminal device 12 may include in the report information related to one of the multiple WLANs. For example, if the terminal device 12 measures BSSID V and BSSID W and both fulfills a criterion for reporting, then the LIE. 12 may only include in the report information/measurements relating to one of BSSID V and BSSID W. Which of the multiple WLANs is included may be configured by the network, e.g. by an associated priority.

In some embodiments, the terminal device 12 can indicate to the network how many WLANs matching a certain index fulfill the reporting condition. For example, if the conditions for reporting for BSSID U, BSSID V and BSSID W are fulfilled the terminal device 12 may report index 1 and index 2 (as in Example 1 above). But the terminal device 12 may then according to this embodiment also indicate that there is one node associated with index 1 for which the conditions are fulfilled, and two nodes associated with index 2 for which the conditions are fulfilled.

In some embodiments, the network (e.g. 3GPP RAN) may indicate to the terminal device 12 that it is to perform a mobility-related procedure towards a WLAN by signaling the associated index. A mobility-related procedure may be one or many of measurement reporting, traffic steering, access selection, traffic aggregation, etc. Prior to this being done the network would need to indicate the identifier to index mapping, as discussed above. For example, the network may indicate to the terminal device 12 that it is to steer traffic to a WLAN with index 1, and the UE 12 would then (according to the example mapping in Example 1 above) steer traffic to the WLAN with BSSID U. If the network indicates to the terminal device 12 to aggregate traffic over WLAN (and 3GPP) with index 2 then the UE 12 may aggregate traffic over WLAN with BSSID V or BSSID W and over 3GPP.

As noted above, it is also possible for the identifier-to-index mapping to be used in other messages/indications/procedures than those described above. For example, another use case for the identifier-to-index mapping is when the network indicates that a terminal device 12 should evaluate an access network selection, traffic steering and/or carrier aggregation mechanism considering only certain WLAN identifiers.

Indication of Whether to Use Indices or Network Identifiers

Not all terminal devices, networks, or network nodes, may be capable of using indices instead of network identifiers. Therefore the network could, in some embodiments, indicate to the terminal device 12 whether to use indices or to use WLAN identifiers when referring to WLANs. For example, if an LTE eNB is capable of using indices instead of WLAN identifiers, that eNB may indicate to the terminal devices 12 it is serving that signalling of indices should be used, while if another LIE eNB is not capable of using indices instead of WLAN identifiers then that eNB may indicate to the terminal device 12 that signalling of WLAN identifiers should be used.

The indication may be explicitly signalled by the network, for example as a bit-flag indication, which could be signalled using dedicated signalling or broadcast signalling. It may be the case that if this bit-flag has not been signalled to the terminal device 12, the terminal device 12 would interpret this as the network indicating that indices should not be used.

In some embodiments it is possible for this indication to be signalled implicitly. The terminal device 12 may consider that the network has indicated that indices should be used if the network signals indices together with the WLAN identifiers, while if the network has not indicated any indices with the WLAN identifiers, the terminal device 12 would consider that the network has indicated that indices should not be used.

Specific Embodiment

Figure 10:
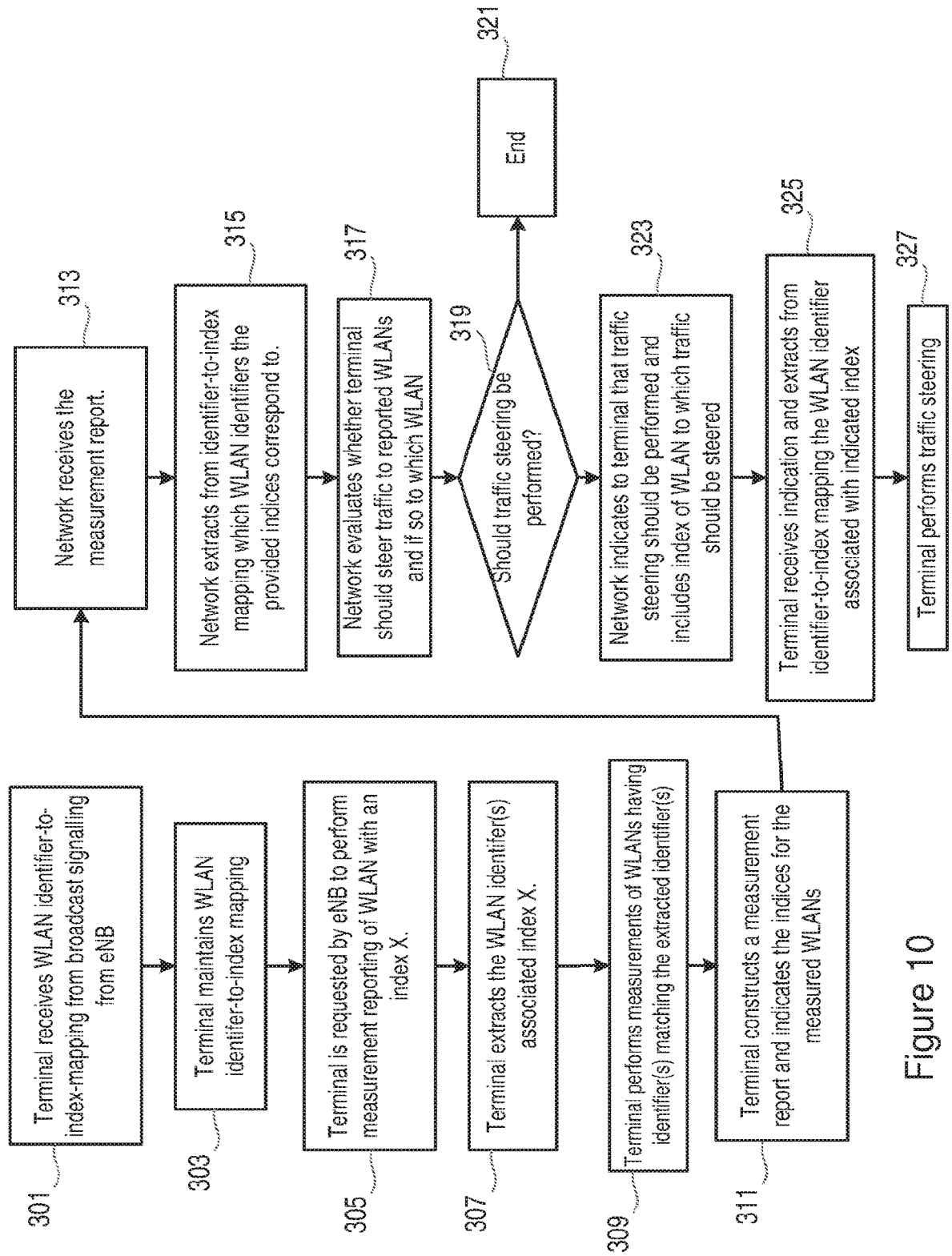
FIG. 10 is a flow chart illustrating a specific embodiment of the techniques described herein.

The flow chart in FIG. 10 illustrates a specific embodiment of the techniques described herein in which an identifier to index mapping is used in a traffic steering command based approach to an access network selection and/or traffic steering. The steps shown in FIG. 10 cover steps performed in both the terminal device and the network (e.g. RAN) node.

Thus, in step 301 a terminal device 12 receives a WLAN identifier to index mapping over broadcast signalling from an eNB 10. The terminal device 12 maintains the mapping (step 303), for example by storing it in a memory unit.

As part of an access network selection and/or traffic steering procedure, the terminal device 12 is requested by the eNB 10 to perform measurement reporting of a WLAN with an index X (step 305).

The terminal device 12 extracts the WLAN identifier(s) associated with index X from the mapping (step 307) and performs measurements of WLANs having identifier(s) matching the extracted identifier(s) (step 309).

The terminal device 12 constructs a measurement report and indicates the indices for the measured WLANs in the report (step 311). The report is sent to the eNB 10.

The network (eNB 10) receives the measurement report (step 313).

The network extracts from the identifier to index mapping the WLAN identifiers corresponding to the indices in the received report (step 315).

The network then evaluates whether the terminal device 12 should steer traffic to the reported WLANs and if so to which WLAN (step 317). If no traffic steering is to be performed, the method ends (steps 319 and 321). If traffic steering is to be performed, the network indicates to the terminal device 12 that traffic steering should be performed (via a traffic steering command) and includes the index of the WLAN to which traffic should be steered (step 323).

The terminal device 12 receives the indication (traffic steering command) and extracts the WLAN identifier associated with the indicated index from the identifier to index mapping (step 325). The terminal device 12 then performs the traffic steering to the appropriate WLAN (step 327).

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

Various exemplary embodiments of the techniques described herein are set out below:

1. A method of operating a terminal device, the method comprising:
   maintaining one or more indices and a mapping between the one or more indices and respective network identifiers, each network identifier identifying a network or a network node; and
   in communications between the terminal device and a first network in which a particular network or a particular network node is to be identified, using the index associated with the particular network or the particular network node to identify the particular network or the particular network node.

2. A method as in embodiment 1, wherein the step of using comprises including the index in a message sent from the terminal device to the first network to identify the particular network or the particular network node to the first network.

3. A method as in embodiment 1 or 2, wherein the method further comprises the step of receiving a message from the first network, the message comprising an index; and the step of using comprises using the index in the received message and the mapping to identify a particular network or a particular network node.

4. A method as in embodiment 1, 2 or 3, wherein communications between the terminal device and the first network comprise at least one of uplink communications from the terminal device to the first network and downlink communications from the first network to the terminal device.

5. A method as in any of embodiments 1-4, wherein each network identifier identifies a network other than the first network or a network node in a network other than the first network.

6. A method as in embodiment 5, wherein the network other than the first network is a network that is operating according to a different radio access technology, RAT, to the first network.

7. A method as in any of embodiments 1-6, wherein the first network is a network operating according to a mobile telecommunications radio access technology, RAT, and the particular network or the particular network node are operating according to a wireless local area network RAT.

8. A method as in embodiment 7, wherein the mobile telecommunications RAT is a 3GPP-specified RAT.

9. A method as in embodiment 7 or 8, wherein the wireless local area network RAT is WLAN or Wi-Fi.

10. A method as in any of embodiments 1-9, wherein each network identifier is an identifier of a WLAN or a network node in a WLAN.

11. A method as in any of embodiments 1-10, wherein at least one network identifier is an identifier for an access point, AP, in a WLAN.

12. A method as in any of embodiments 1-11, wherein at least one network identifier is a service set identification, SSID, a basic SSID, BSSID, an extended SSID, ESSID, a homogenous ESSID, HESSID, Realm identifier, a Network Access Indicator, NAI, a public land mobile network, PLMN identifier, or a Domain Name list.

13. A method as in any of embodiments 1-12, the method further comprising the step of:
   receiving the one or more indices and the mapping between the one or more indices and respective network identifiers from the first network.

14. A method as in embodiment 13, wherein the one or more indices and the mapping between the one or more indices and respective network identifiers are received from the first network in broadcast signalling and/or dedicated signalling.

15. A method as in embodiment 13 or 14, wherein the one or more indices and the mapping between the one or more indices and respective network identifiers are received from a network node in the radio access network, RAN, of the first network.

16. A method as in embodiment 13, wherein the one or more indices and the mapping between the one or more indices and respective network identifiers are received from a core network node in the first network.

17. A method as in embodiment 16, wherein the one or more indices and the mapping between the one or more indices and respective network identifiers are received from a core network node in the first network in non-access stratum, NAS, signalling.

18. A method as in any of embodiments 1-17, the method further comprising e steps of:
   receiving a list and/or sequence of one or more network identifiers from the first network; and
   determining the one or more indices and mapping between the one or more indices and the one or more network identifiers based on the position of each network identifier in the received list and/or sequence.

19. A method as in any of embodiments 1-18, wherein each index comprises a numerical value or an alphanumerical value.

20. A method as in any of embodiments 1-19, wherein the index is signalled using a priority value in communications between the terminal device and the first network.

21. A method as in any of embodiments 1-20, wherein a default value for an index is used in communications between the terminal device and the first network for a network identifier that is not included in the mapping.

22. A method as in any of embodiments 1-21, wherein two or more networks or network nodes have the same index.

23. A method as in embodiment 22, wherein in the event that at least one of the networks or network nodes having the same index is to be identified in communications between the terminal device and the first network, the communications between the terminal device and the first network further comprise an indication of how many of said networks or network nodes having the same index the communications apply to.

24. A method as in any of embodiments 1-23, wherein a network identifier has two or more associated indices.

25. A method as in embodiment 24, wherein the method further comprises the step of:
   for a network identifier that has two or more associated indices, determining an action to take with respect to the particular network or the particular network node identified by the network identifier based on which of the two or more indices associated with the network identifier has been received from the first network.

26. A method as in any of embodiments 1-25, wherein a particular network or a particular network node has two or more associated network identifiers, each network identifier having a respective index, and in communications between the network node and a terminal device in which the particular network or particular network node having the two or more associated network identifiers is to be identified, the step of using comprises using one or more of the indices to identify the particular network or the particular network node.

27. A method as in embodiment 26, wherein the two or more associated network identifiers are different types of network identifiers, and the step of using comprises using an index for a specific type of network identifier to identify the particular network or the particular network node.

28. A method as in any of embodiments 1-27, wherein the method further comprises the step of receiving an indication from the first network of whether the terminal device is to use network identifiers or indices to identify particular networks or particular network nodes in communications between the terminal device and the first network.

29. A method as in any of embodiments 1-28, wherein communications between the terminal device and the first network comprise communications relating to an access network selection, traffic steering and/or traffic aggregation procedure.

30. A method as in any of embodiments 1-29, wherein communications between the terminal device and the first network comprise communications relating to an access network selection, traffic steering and/or traffic aggregation procedure between the first network and a second network operating according to a different radio access technology, RAT, to the first network.

31. A method as in embodiment 30, wherein each network identifier identifies a particular second network or a particular network node in the second network.

32. A terminal device, wherein the terminal device is adapted to:
maintain one or more indices and a mapping between the one or more indices and respective network identifiers, each network identifier identifying a network or a network node; and
use the index associated with the particular network or the particular network node to identify the particular network or the particular network node in communications between the terminal device and a first network in which a particular network or a particular network node is to be identified.

Various other embodiments of the terminal device are contemplated in which the terminal device is further adapted to operate according to any of the above method embodiments.

33. A method of operating a network node in a first network, the method comprising:
maintaining one or more indices and a mapping between the one or more indices and respective network identifiers, each network identifier identifying a network or a network node; and
in communications between the network node and a terminal device or other network node in which a particular network or a particular network node is to be identified, using the index associated with the particular network or the particular network node to identify the particular network or the particular network node.

34. A method as in embodiment 33, wherein the step of using comprises including the index in a message sent to the terminal device or other network node from the network node to identify the particular network or the particular network node to the terminal device or other network node.

35. A method as in embodiment 33 or 34, wherein the method further comprises the step of receiving a message from the terminal device or other network node, the message comprising an index; and the step of using comprises using the index in the received message and the mapping to identify a particular network or a particular network node.

36. A method as in embodiment 33, wherein communications between the terminal device and the first network comprise at least one of uplink communications from the terminal device to the network node and downlink communications from the network node to the terminal device.

37. A method as in any of embodiments 33-36, wherein each network identifier identifies a network other than the first network or a network node in a network other than the first network.

38. A method as in embodiment 37, wherein the network other than the first network is a network that is operating according to a different radio access technology, RAT, to the first network.

39. A method as in any of embodiments 33-38, wherein the first network is a network operating according to a mobile telecommunications radio access technology, RAT, and the particular network or the particular network node are operating according to a wireless local area network RAT.

40. A method as in embodiment 39, wherein the mobile telecommunications RAT is a 3GPP-specified RAT.

41. A method as in embodiment 39 or 40, wherein the wireless local area network RAT is WLAN or Wi-Fi.

42. A method as in any of embodiments 33-41, wherein each network identifier is an identifier of a WLAN or a network node in a WLAN.

43. A method as in any of embodiments 33-42, wherein at least one network identifier is an identifier for an access point, AP, in a WLAN.

44. A method as in any of embodiments 33-43, wherein at least one network identifier is a service set identification, SSID, a basic SSID, BSSID, an extended SSID, ESSID, a homogenous ESSID, HESSID, Realm identifier, a Network Access Indicator, NAI, a public land mobile network, PLMN identifier, or a Domain Name list.

45. A method as in any of embodiments 33-44, wherein the method further comprises the step of:
determining the one or more indices and the mapping between the one or more indices and the respective network identifiers.

46. A method as in any of embodiments 33-45, wherein the method further comprises the step of:
receiving the one or more indices and the mapping between the one or more indices and the respective network identifiers from a network node in the radio access network, RAN, of the first network or a network node in the core network of the first network.

47. A method as in any of embodiments 33-46, wherein the method further comprises the step of:
sending the one or more indices and the mapping between the one or more indices and respective network identifiers to the terminal device or other network node.

48. A method as in embodiment 47, wherein the one or more indices and the mapping between the one or more indices and respective network identifiers are sent to the terminal device in broadcast signalling or dedicated signalling.

49. A method as in any of embodiments 33-48, wherein the method further comprises the steps of:
   sending a list and/or sequence of one or more network identifiers to the terminal device or other network node; and
   determining one or mare indices and mapping between the one or more indices and the one or more network identifiers based on the position of each network identifier in the sent list and/or sequence.

50. A method as in any of embodiments 33-49, wherein each index comprises a numerical value or an alphanumerical value.

51. A method as in any of embodiments 33-50, wherein the index is signalled using a priority value in communications between the network node and the terminal device or other network node.

52. A method as in any of embodiments 33-51, wherein a default value for an index is used in communications between the network node and terminal device or other network node for a network identifier that is not included in the mapping.

53. A method as in any of embodiments 33-52, wherein two or more networks or network nodes have the same index.

54. A method as in embodiment 53, wherein in the event that at least one of the networks or network nodes having the same index is to be identified in communications between the network node and the terminal device or other network node, the communications between the network node and the terminal device or other network node further comprise an indication of how many of said networks or network nodes having the same index the communications apply to.

55. A method as in any of embodiments 33-54, wherein a network identifier has two or more associated indices.

56. A method as in embodiment 5 y, wherein the method further comprises the steps of:
   for each of the two or more indices associated with a network identifier, associating an action for the terminal device or other network node to take with respect to the particular network or the particular network node;
   determining an action for the terminal device or other network node to take with respect to the particular network or the particular network node identified by the network identifier; and
   using the index associated with the determined action in communications with the terminal device or other network node to cause the terminal device or other network node to take the determined action with respect to the particular network or the particular network node.

57. A method as in any of embodiments 33-56, wherein a particular network or a particular network node has two or more associated network identifiers, each network identifier having a respective index, and in communications between the network node and a terminal device or other network node in which the particular network or particular network node having the two or more associated network identifiers is to be identified, the step of using comprises using one or more of the indices to identify the particular network or the particular network node.

58. A method as in embodiment 57, wherein the two or more associated network identifiers are different types of network identifiers, and the step of using comprises using an index for a specific type of network identifier to identify the particular network or the particular network node.

59. A method as in any of embodiments 33-58, wherein the method further comprises the step of sending an indication to the terminal device or other network node indicating whether the terminal device or other network node is to use network identifiers or indices to identify particular networks or particular network nodes in communications between the network node and the terminal device or other network node.

60. A method as in any of embodiments 32-59, wherein the communications comprise communications with the terminal device relating to an access network selection, traffic steering and/or traffic aggregation procedure.

61. A method as in any of embodiments 32-59, wherein the communications comprise communications with the terminal device relating to an access network selection, traffic steering and/or traffic aggregation procedure between the first network and a second network operating according to a different radio access technology, RAT, to the first network.

62. A method as in any of embodiments 61, wherein each network identifier identifies a particular second network or a particular network node in the second network.

63. A network node for use in a first network, wherein the network node is adapted to maintain one or more indices and a mapping between the one or more indices and respective network identifiers, each network identifier identifying a network or a network node; and use the index associated with the particular network or the particular network node to identify the particular network or the particular network node in communications between the network node and a terminal device or other network node in which a particular network or a particular network node is to be identified.

Various other embodiments of the network node are contemplated in which the network node is further adapted to operate according to any of the above method embodiments.

64. A method of operating a network node in a first network, the method comprising:
   determining one or more indices and a mapping between the one or more indices and respective network identifiers, each network identifier identifying a network or a network node; and
   sending the one or more indices and the mapping to another network node in the first network or to a terminal device in the first network.

65. A method as in embodiment 64, wherein each network identifier identifies a network other than the first network or a network node in a network other than the first network.

66. A method as in embodiment 65, wherein the network other than the first network is a network that is operating according to a different radio access technology, RAT, to the first network.

67. A method as in any of embodiments 64-66, wherein the first network is a network operating according to a mobile telecommunications radio access technology, RAT, and the particular network or the particular network node are operating according to a wireless local area network RAT.

68. A method as in embodiment 67, wherein the mobile telecommunications RAT is a 3GPP-specified RAT.

69. A method as in embodiment 67 or 68, wherein the wireless local area network RAT is WLAN or Wi-Fi.

70. A method as in any of embodiments 64-69, wherein each network identifier is an identifier of a WLAN or a network node in a WLAN.

71. A method as in any of embodiments 64-71, wherein at least one network identifier is an identifier for an access point, AP, in a WLAN.

72. A method as in any of embodiments 64-71, wherein at least one network identifier is a service set identification, SSID, a basic SSID, BSSID, an extended SSID, ESSID, a homogenous ESSID, HESSID, Realm identifier, a Network Access Indicator, NAI, a public land mobile network, PLMN identifier, or a Domain Name list.

73. A method as in any of embodiments 64-72, wherein the network node is a node in the core network of the first network, and the step of sending comprises sending the one or more indices and the mapping to a terminal device in the first network using non-access stratum, NAS, signalling.

74. A method as in any of embodiments 64-73, wherein each index comprises a numerical value or an alphanumerical value.

75. A method as in any of embodiments 64-74, wherein two or more networks or network nodes have the same index.

76. A method as in any of embodiments 64-75, wherein a network identifier has two or more associated indices.

77. A method as in any of embodiments 64-76, wherein the network node is a network node in the core network of the first network.

78. A network node for use in a first network, the network node being adapted to determine one or more indices and a mapping between the one or more indices and respective network identifiers, each network identifier identifying a network or a network node; and send the one or more indices and the mapping to another network node in the first network or to a terminal device in the first network.

Various other embodiments of the network node are contemplated in which the network node is further adapted to operate according to any of the above method embodiments.

79. A computer program product comprising a computer readable medium having computer readable code embodied therein, the computer readable code being configured such that, on execution by a suitable computer or processor, the computer or processor is caused to perform any of the method embodiments described above.

The invention claimed is:

1. A method of operating a terminal device, the method comprising:
   receiving a sequence of network identifiers from a first network;
   determining one or more indices for each network identifier in the received sequence, based on positions of the network identifiers in the received sequence; and
   in communications between the terminal device and a first network, using the one or more indices to identify at least one network node.

2. The method of claim 1, wherein determining one or more indices for each network identifier in the received sequence comprises:
   assigning a common index to two or more network identifiers in the received sequence; and
   assigning a unique index to each of the two or more network identifiers.

3. The method of claim 2, wherein using the one or more indices to identify at least one network node comprises:
   determining whether to use the common index or unique indices based on a type of action to be taken with respect to the at least one network node.

4. The method of claim 1, wherein determining one or more indices for each network identifier in the received sequence comprises:
   assigning a same index to two or more network identifiers in the received sequence that belong to a same network.

5. The method of claim 4, wherein the two or more network identifiers belong to a same service set identification (SSID).

6. The method of claim 1, wherein the communications between the terminal device and the first network comprise at least one of:
   uplink communications from the terminal device to the first network or downlink communications from the first network to the terminal device.

7. The method of claim 1, wherein using the one or more indices to identify at least one network node comprises:
   using the one or more indices to identify at least one network node in a second network that operates according to a different radio access technology (RAT) than the first network.

8. The method of claim 7, wherein the first network operates according to a mobile telecommunications RAT, and the second network operates according to a wireless local area network RAT.

9. The method of claim 8, wherein the mobile telecommunications RAT is a 3GPP-specified RAT.

10. The method of claim 8, wherein the wireless local area network RAT is WLAN or Wi-Fi.

11. The method of claim 1, wherein using the one or more indices to identify at least one network node comprises:
    sending, to the at least one network node in the first network, a message comprising the one or more indices.

12. The method of claim 1, further comprising:
    receiving a message from the first network, the message comprising the one or more indices; and
    using the one or more indices to identify the at least one network node.

13. The method of claim 1, wherein each of the one or more indices comprises a numerical value or an alphanumerical value.

14. The method of claim 1, further comprising:
    signaling, in the communications between the terminal device and the first network, the one or more indices using a priority value.

15. The method of claim 1, further comprising:
    receiving, from the first network, an indication of whether the terminal device is to use a network identifier or an index to identify a network node in communications between the terminal device and the first network.

16. The method of claim 1, wherein the communications between the terminal device and the first network comprise at least one of:
    communications relating to an access network selection, traffic steering, or traffic aggregation procedure.

17. The method of claim 1, wherein at least one network identifier comprises:
    a service set identification (SSID), a basic SSID (BSSID), an extended SSID (ESSID), a homogenous ESSID (HESSID), a Realm identifier, a Network Access Indicator (NAI), a public land mobile network (PLMN) identifier, or a Domain Name list.

18. A terminal device, comprising:
    a memory storing instructions; and
    a processor configured to execute the instructions to:
    receive a sequence of network identifiers from a first network;

determine one or more indices for each network identifier in the received sequence, based on positions of the network identifiers in the received sequence; and in communications between the terminal device and a first network, use the one or more indices to identify at least one network node.

19. The terminal device of claim 18, wherein the processor is further configured to execute the instructions to:

assign a common index to two or more network identifiers in the received sequence; and assign a unique index to each of the two or more network identifiers.

20. A non-transitory computer-readable medium comprising a computer program code that, when executed by a processor coupled to a terminal device, causes the terminal device to perform operations comprising:

receiving a sequence of network identifiers from a first network;

determining one or more indices for each network identifier in the received sequence, based on positions of the network identifiers in the received sequence; and in communications between the terminal device and a first network, using the one or more indices to identify at least one network node.

* * * * *